(12) United States Patent
Wang et al.

(10) Patent No.: US 10,264,077 B2
(45) Date of Patent: Apr. 16, 2019

(54) SYSTEM AND METHODS FOR EMPLOYING NON-RELATED COMMUNICATION ARCHITECTURE FOR SIGNALING IN ANOTHER COMMUNICATION ARCHITECTURE

(71) Applicant: Netsapiens, La Jolla, CA (US)

(72) Inventors: David Tzat Kin Wang, Solana Beach, CA (US); Chris Aaker, San Diego, CA (US)

(*) Notice: Subject to any disclaimer, the term of this patent is extended or adjusted under 35 U.S.C. 154(b) by 295 days.

(21) Appl. No.: 15/090,528

(22) Filed: Apr. 4, 2016

(65) Prior Publication Data

US 2017/0289264 A1    Oct. 5, 2017

(51) Int. Cl.
*G06F 15/16* (2006.01)
*H04L 29/08* (2006.01)
*H04L 29/06* (2006.01)

(52) U.S. Cl.
CPC ......... *H04L 67/141* (2013.01); *H04L 65/104* (2013.01); *H04L 65/1006* (2013.01); *H04L 65/1069* (2013.01); *H04L 65/1073* (2013.01)

(58) Field of Classification Search
USPC .................. 709/227, 230, 237, 245, 246
See application file for complete search history.

(56) References Cited

U.S. PATENT DOCUMENTS

| | | | | |
|---|---|---|---|---|
| 2005/0255811 A1* | 11/2005 | Allen | ............. | H04W 84/08 455/78 |
| 2010/0070563 A1* | 3/2010 | Baker | ............. | H04L 65/1046 709/203 |
| 2015/0031341 A1* | 1/2015 | Bar On | ............. | H04M 3/42195 455/414.1 |
| 2016/0119468 A1* | 4/2016 | Efrati | ............. | H04M 3/02 370/431 |
| 2017/0164141 A1* | 6/2017 | Swaminathan | ....... | H04W 4/008 |

* cited by examiner

*Primary Examiner* — Lan Dai T Truong
(74) *Attorney, Agent, or Firm* — Merle W Richman, Esq.

(57) ABSTRACT

A system (20A), topology, and methods to provide signals to devices (30A-I) in a real-time media communication architecture (10A-C) via another communication architecture or server (50) including a push signal architecture. The push signal may direct a device (30A-I) to re-register with a real-time media communication system (20A) in order to participate in a real-time media event. Other embodiments may be described and claimed.

20 Claims, 6 Drawing Sheets

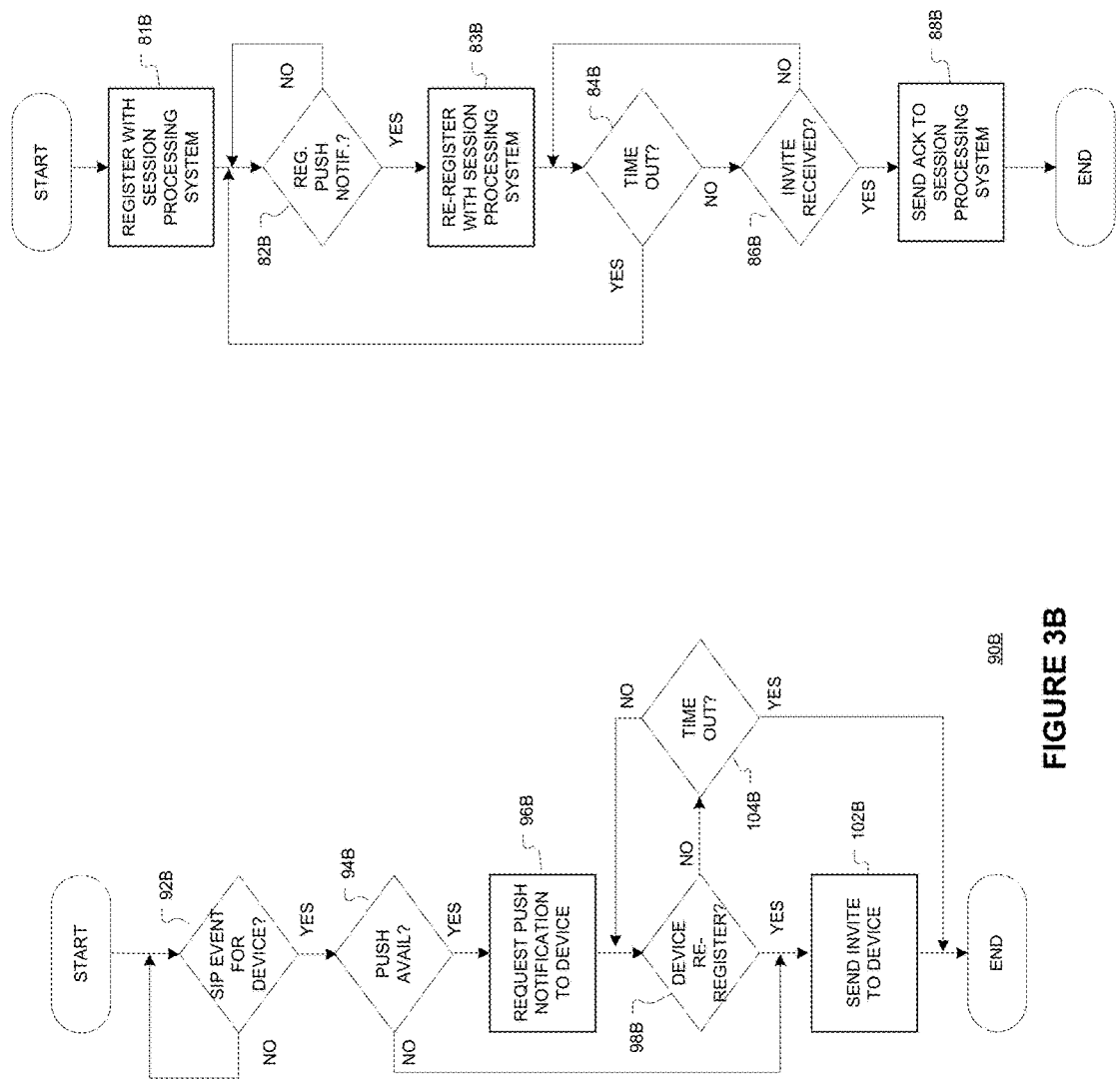

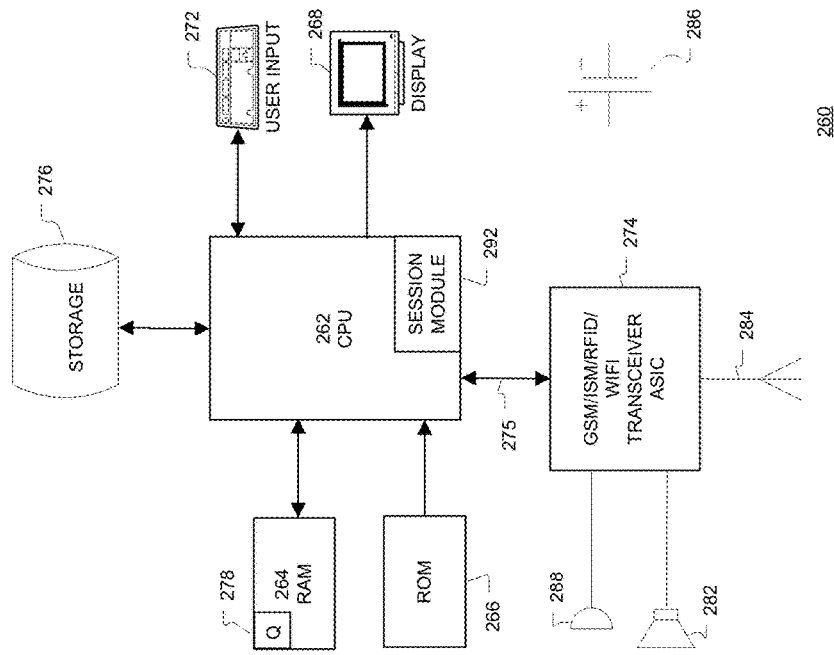
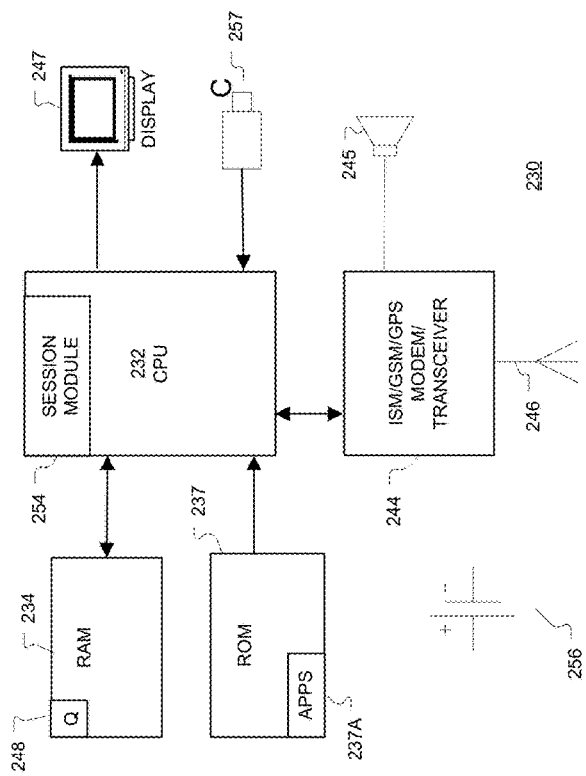
FIGURE 5B
FIGURE 5A

US 10,264,077 B2

SYSTEM AND METHODS FOR EMPLOYING NON-RELATED COMMUNICATION ARCHITECTURE FOR SIGNALING IN ANOTHER COMMUNICATION ARCHITECTURE

TECHNICAL FIELD

Various embodiments described herein relate to communication architectures enabling real-time (RT) media communications.

BACKGROUND INFORMATION

It may be desirable to enable RT media communication between devices in a communication architecture. Devices in such an architecture may be required to be registered and re-register with the architecture on a periodic basis to ensure their continued presence in architecture and thus ability to participate in RT media communications with other devices in architecture. Periodic registration as required by such architecture may place an unacceptable burden on a device. Such burden may include unacceptable energy consumption where the device is operating on a limited energy source including a mobile device. The present invention provides a system and method to reduce this burden.

BRIEF DESCRIPTION OF THE DRAWINGS

FIG. 3B is a flow diagram illustrating several methods for a session processing system in a communications architecture according to various embodiments.

FIG. 4B is a flow diagram illustrating several methods for an IP networked device in a communications architecture according to various embodiments.

FIG. 5A is a block diagram of an article according to various embodiments.

FIG. 5B is a block diagram of an article according to various embodiments.

DETAILED DESCRIPTION

Figure 1A:
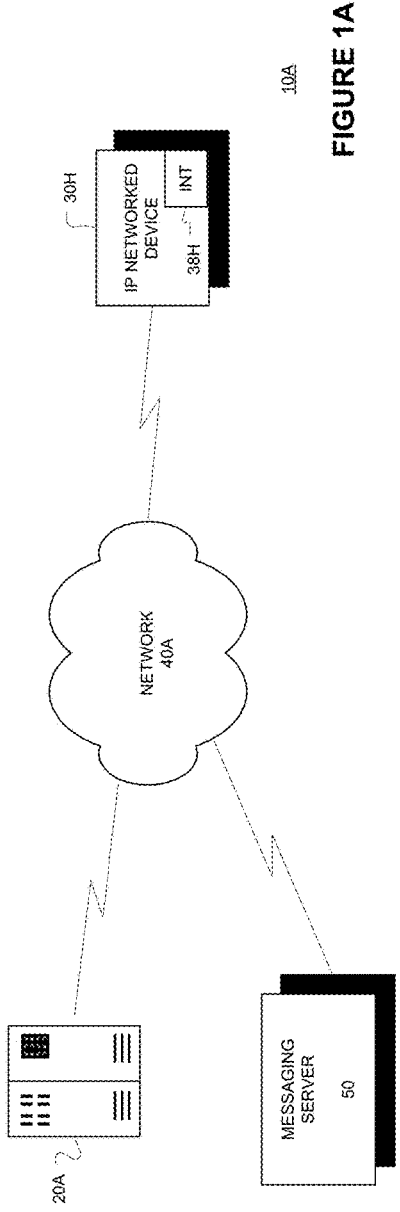
FIG. 1A is a simplified diagram of a communications architecture according to various embodiments.
Figure 1B:
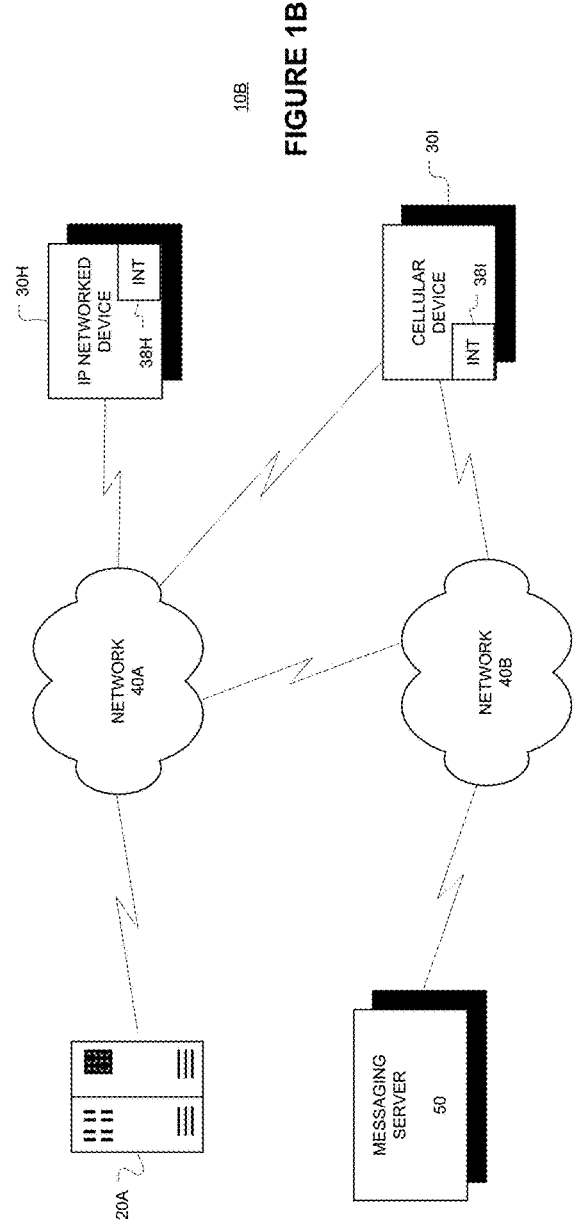
FIG. 1B is a simplified diagram of a communications architecture according to various embodiments.
Figure 1C:
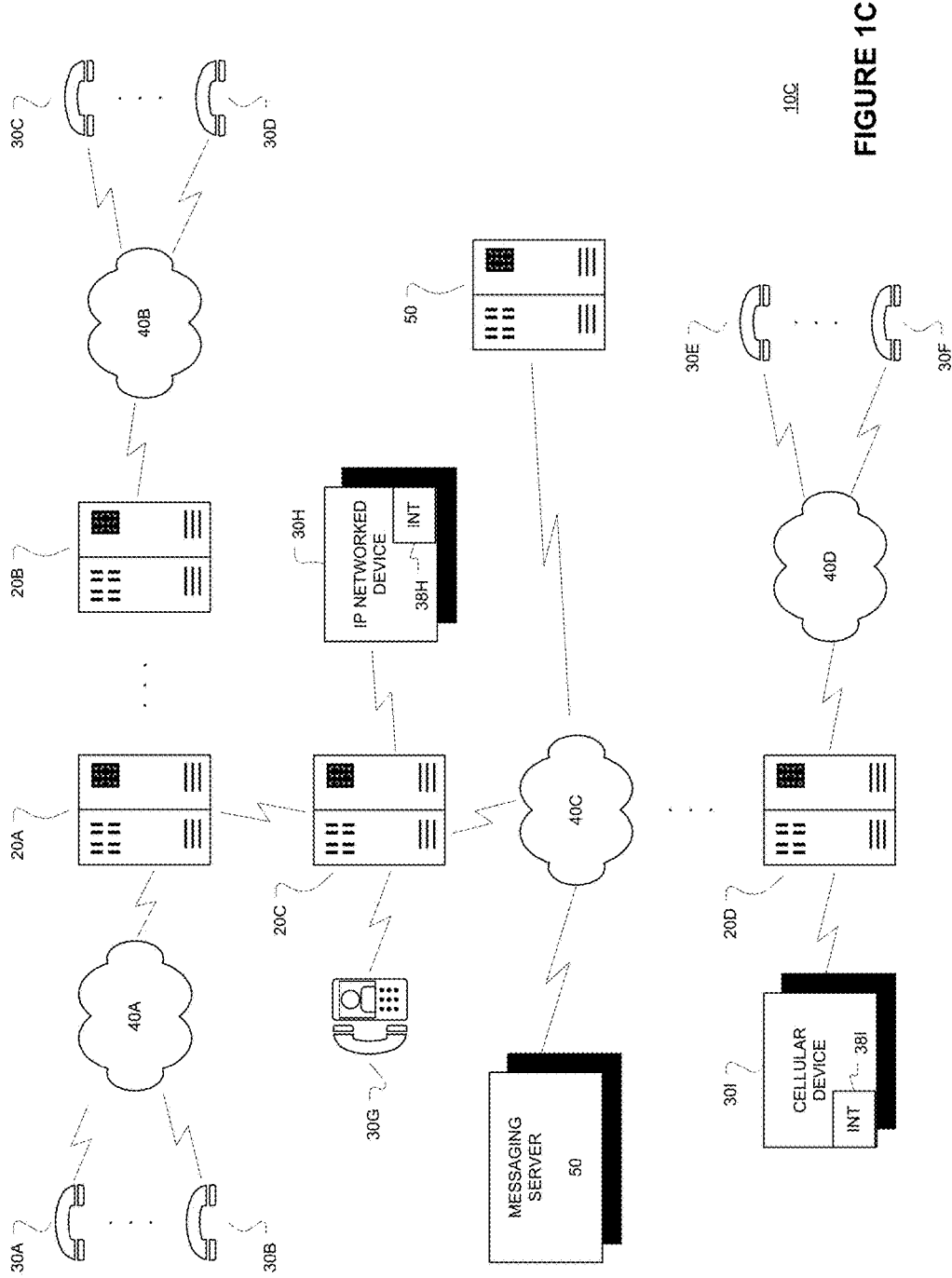
FIG. 1C is a simplified diagram of a distributed communications architecture according to various embodiments.

An electronic session provider including a software session provider, voice over internet protocol (VOIP) provider, or application service provider (ASP) may provide real-time (RT) media sessions to or enable real-time media events (media may include multimedia events such as voice, video, or other sound events) sessions between user devices (session devices 30A-30I—FIG. 1C). A session processing system 20A-20D may provide requested sessions or communicate session data between systems 20A-20D and User IP networked session capable devices 30A-I. In order to support user session devices 30A-I that are large in number or geographically separated, an architecture 10C may include multiple session processing systems or servers 20A-20D. A session processing system 20A-20D may use particular protocol(s) on particular channel(s) on networks 40A-D to enable real-time media sessions between user devices 30A-30I. A session processing system 20A-20D may employ real-time protocols (RTP) to enable RT media sessions between devices 30A-30I including employing the Session Initiation Protocol (SIP) on SIP related channel(s).

In architectures employing SIP, each device 30A-30I may have an associated Internet Protocol (IP) address. Each device 30A-30I in an SIP architecture may be required to initially register with a session processing system 20A-20D and re-register with the session processing system 20A-20D via SIP communications (particular protocols and channels) periodically. A SIP registration message may include contact information for the user and user credentials (when requested). The contact information may include the IP addresses for any authorized IP networked devices 30A-30I. In an embodiment, a User's IP networked device 30A-30I may have limited energy storage such a battery in a cellular device 30I. In addition, IP based RT media communication events may consume more energy than via other communication events (using other protocols or channels). Further, an IP networked device 30H and cellular device 30I may already be communicating with other systems or servers on a periodic basis (via other protocols or channels in an embodiment). For example, a cellular device 30I may communicate with cellular network infrastructure (40B of FIG. 1B) on a periodic basis using different protocol(s)/channel(s) than SIP based protocol(s) and related channel(s).

An IP networked device 30A-I may receive push notifications from a messaging server 50 via the cellular network 40B or IP network 40A. Such an IP networked device 30A-I may adhere to different communication protocols and channel requirements of the messaging server 50 in order to receive push notifications including simple messaging system (SMS) notifications. In an embodiment, an IP networked device 30A-30I that is capable of receiving push notifications may provide an indication of their push address(es) or contact(s) in addition to IP address(es) in a registration message to session processing system 20A-D.

In an embodiment, a session processing system 20A-20D may send a push notification (via a messaging server 50) to a push notification capable IP networked device 30A-30I to re-register with the system 20A-20D when a RT media event is pending for the device 30A-30I. The push message may only provide an indication to re-register with the session processing system 20A-20D. The push message may not include or need any confidential information, protecting confidentiality and security if the message is delivered incorrectly or intercepted.

Once the IP networked device 30A-30I re-registers with the session processing system 20A-20D, the session processing system 20A-20D may send an invite to the IP networked device 30A-30I including for a RT media event. In such an embodiment, a push notification capable IP networked device 30A-30I may not be required or need to re-register with a session processing system 20A-20D periodically. Such a device 30A-30I in such an embodiment may be save limited resources (energy) while still being able to participate in RT media events.

FIG. 1A is a simplified diagram of communications architecture 10A according to various embodiments. As shown in FIG. 1A, architecture 10A may include a session processing system 20A, a messaging server 50, and an IP networked device 30H. The session processing system 20A may be coupled to the IP networked device 30H via an IP network 40A. The session processing system 20A may also be coupled to the messaging server 50 via the IP network 40A and communicate via a first protocol and first channel. The messaging server 50 may also be coupled to the IP networked device 30H via the IP network 40A. In an embodiment, the messaging server 50 may be able to send push notifications to the IP networked device 30H upon request of the session processing system 20A via a second protocol and a second channel. The messaging server 50 may be part of a cellular, IP, or satellite infrastructure in an embodiment.

In an embodiment, the messaging server 50 may support Apple Push Notifications (APNs) protocols (a $2^{nd}$ protocol versus another protocol for SIP communications) and APN communication channels (2nd channels). In such an embodiment, the messaging server 50 may be able to send messages via APN to an IP networked device 30A-I that is capable of receiving APNs including devices 30A-I supporting or running an Iphone Operating System (IOS). In an embodiment, the messaging server 50 may also support Google Cloud Messaging (GCM) protocols ($2^{nd}$ protocol) and GCM communication channels ($2^{nd}$ channels). In such an embodiment, the messaging server 50 may be able to send push messages via GCM to an IP networked device 30A-I that is capable of receiving GCM based messages including devices 30A-I supporting or operating an Iphone Operating System (IOS) or an Android operating system.

FIG. 1B is a simplified diagram of communications architecture 10B according to various embodiments. As shown in FIG. 1B, architecture 10B may include a session processing system 20A, a messaging server 50, an IP networked device 30H, and a cellular device 30I. The cellular device 30I may also support IP communication protocols/channels in addition to cellular based communication protocols/channels in an embodiment. The session processing system 20A may be coupled to the IP networked device 30H via an IP network 40A and the cellular device 30I directly via the IP network 40A or indirectly via the combination of the IP network 40A and the cellular network 40B. A cellular device 30I may be able to communicate on cellular networks 40B and IP networks 40A. The session processing system 20A may also be coupled to the messaging server 50 via the IP network 40A and the cellular network 40B. In an embodiment, the messaging server 50 may be part of a cellular provider infrastructure. The messaging server 50 may be coupled to the IP networked device 30H via the cellular network 40B and the IP network 40A. The messaging server 50 may be coupled to the cellular device 30I via the cellular network 40B. In an embodiment, the messaging server 50 may be able to send push notifications to the IP networked device 30H and the cellular device 30I upon request of the session processing system 20A. The messaging server 50 may be part of a cellular, IP, or satellite infrastructure in an embodiment.

FIG. 1C is a simplified diagram of another communication architecture 10C according to various embodiments. The architecture 10C may include distributed session processing systems 20A-20D. As shown in FIG. 1C, architecture 10C may include a plurality of user session devices 30A-30B, 30C-30D, and 30E-30F, and user session devices 30G-30I, cloud interfaces 40A-40D, session processing systems 20A-20D, and a messaging server 50. The plurality of session devices 30A-B may communicate with the session processing system 20A via a first cloud 40A. The plurality of session devices 30C-D may communicate with the session processing system 20B via a second cloud 40B. The session processing system 20A may be coupled directed or indirectly with session processing system 20B via other session processing systems or cloud interfaces. Clouds or cloud interfaces 40A-D may represent local networks or a network of networks termed the "Internet" in an embodiment. One or more cloud interfaces 40A-D may also represent a cellular, satellite, or combination of cellular and satellite networks in an embodiment.

Figure 2A:
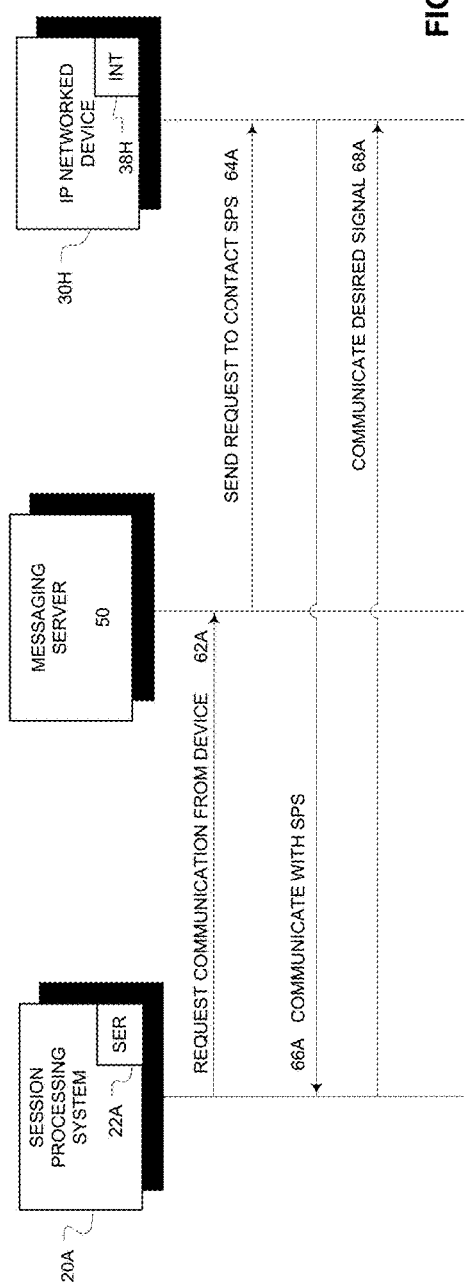
FIG. 2A is a diagram of communication between an IP networked device, a session processing system, and a messaging server in a communication architecture according to various embodiments.
Figure 2B:
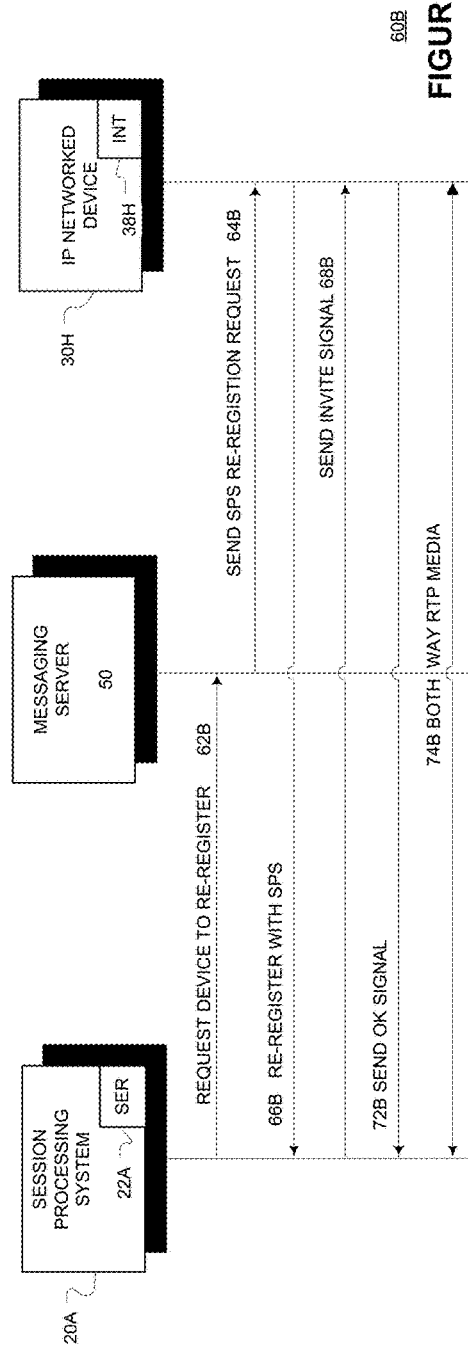
FIG. 2B is a diagram of communication between an IP networked device, a session processing system, and a messaging server in a communication architecture according to various embodiments.

User session devices 30G and 30H may communicate with another session processing system 20C. The session processing system 20C by coupled directly or indirectly to other session processing systems 20A and 20D. User session device 30I may communicate with a session processing system 20D. The plurality of session devices 30E-F may communicate with the session processing system 20B via cloud 40D. The session processing system 20D may be coupled directly or indirectly to another session processing systems 20C. The user session devices 30A-30I may be any device capable of communicating with a session processing system 20A-20D via session communication protocols. As shown in FIG. 1A-1C, a user device 30H, 30I may include an interface 38H, 38I, respectively. The interface 38H, 38I may enable a device 30H, 30I to communicate with a session processing system 20A-20D and messaging server 50 via various networks 40A-D. A session processing system 20A as shown in FIGS. 2A and 2B may include a server 22A. The server 22A may enable a session processing system 20A to communicate RT media and notifications with a user IP networked device 30A-30I and messaging server 50 via various networks 40A-D.

The messaging server 50 may communicate with any of the IP devices 30A to 30I via the interface or network 40C and another interface or network 40A, 40B, 40D. For example, a user session device 30A-30I may support RT media communication protocols/channels and communicate with a session processing system 20A-20D via wired or wireless protocols/channels. A user session device 30A-30I may also support push notification communication protocols/channels and communicate with a messaging server 50 via wired or wireless protocols/channels. A user session device 30A-30I may include a RT media communication and push notification communication enabled device, RT media/push notification communication modem, cellular device, personal data device, laptop, desktop, tablet, or other device including a modulator/demodulator (modem in the interface 38H, 38I), network interface, or processor capable of communicating and supporting a RT media and push notification protocol(s)/channel(s) as provided, hosted, or communicated by one or more session processing system(s) 20A-20D and messaging server 50.

As shown in FIGS. 1A-C, an architecture 10A-C may include multiple user IP networked devices 30A-I. A user or client may own multiple user IP networked devices 30A-I and may conduct multiple RT media events or sessions simultaneously, such as in a call center. A single user may also conduct multiple RT media events or sessions in an architecture including multiple RT media events of sessions (e.g., one live call via a first IP networked device 30A-I and other IP networked device 30A-I providing voicemail). The communications shown in FIGS. 2A and 2B and algorithm shown in FIGS. 3A, 3B, 4A, 4B may be used or employed for one or more User devices 30A-I in an architecture 10A-10C.

Figure 4A:
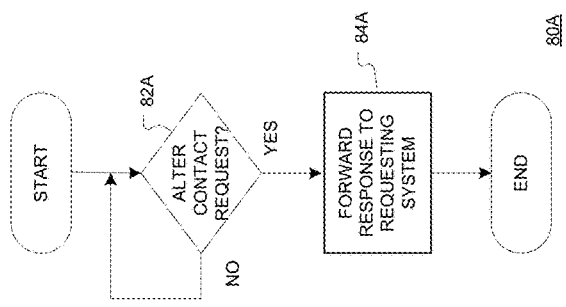
FIG. 4A is a flow diagram illustrating several methods for an IP networked device in a communications architecture according to various embodiments.
Figure 3A:
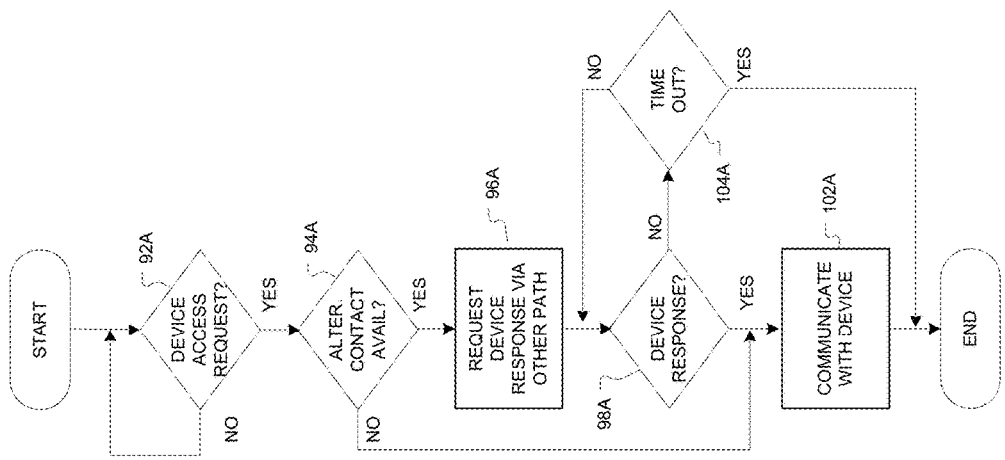
FIG. 3A is a flow diagram illustrating several methods for a session processing system in a communications architecture according to various embodiments.

FIG. 2A is a diagram of communication 60A between an IP networked device 30H, a RT media session processing system 20A, and a messaging server 50 in a communication architecture according to various embodiments. FIG. 3A is a flow diagram 90A illustrating several methods for a RT media session processing system 20A-D according to various embodiments. FIG. 4A is a flow diagram 80A illustrating several methods for an IP networked device 30A-H according to various embodiments. As noted a messaging server 50 may enable push notification communication (via particular protocol(s)/channel(s)) between various systems including between a session processing system 20A-D and an IP networked device 30A-30H. In an embodiment, a session processing system 20A may desire to communicate with a User's IP networked device 30H via a particular first communication protocol and channel may need or want to verify that the IP networked device 30H is prepared or able to communicate with the session processing system 20A via a particular first communication protocol and a first channel. The first channel may include the networks 40A-40D and systems 20A-20D that may participate in the communication of data or messages between the session processing system 20A and the IP networked device 30H via the first communication protocol.

The messaging server 50 may be able to communicate with the User's IP networked device 30H via a second communication protocol and a second channel in an embodiment. The IP networked device 30H may inform the session processing system 20A that it is able to communicate via the second communication protocol and the second channel. In addition, a system in the second channel may inform the session processing system 20A that the IP networked device 30H is able to communicate via the second communication protocol and the second channel (for push notifications in an embodiment). The second channel may include the networks 40A-40D, the messaging server 50, and systems 20A-20D that may participate in the communication of data or messages between the session processing system 20A and the IP networked device 30H via the second communication protocol. It is noted that the first channel and the second channel may be identical in an embodiment and only the communication protocols (first and second) may be different. It is noted that the first communication protocol and the second communication protocol may be identical in an embodiment and only the channels (first and second) may be different.

In an embodiment, a session processing system 20A may need to communicate with an IP networked device 30H via a $1^{st}$ communication protocol and $1^{st}$ channel because another device wants to communicate with the device 30H in such a manner (activity 92A). The requesting device may want to communicate with device 30H via a $1^{st}$ communication protocol and $1^{st}$ channel where the session processing system 20A is part of the $1^{st}$ channel. In an embodiment, the $1^{st}$ communication protocol may be SIP and the session processing system 20A may enable SIP sessions between a requesting device and the IP networked device 30H. When the session processing system 20A has knowledge that the IP networked device 30H is capable of communicating via a $2^{nd}$ communication protocol and 2nd channel (alternative contact available to communicate with device 30H (activity 94A)), the sessions processing system 20A may send a request to communicate with the device 30H via the $2^{nd}$ communication protocol and $2^{nd}$ channel (activity 96A—request device 30H response via other path or channel and communication 62A of FIG. 2A). The session processing system 20A may send the request 62A to a system or server 50 that is part of the $2^{nd}$ channel, the messaging server 50 in an embodiment, thereby directing or requesting the messaging server 50 to contact the IP networked device 30H. The $2^{nd}$ communication protocol may be a push notification protocol and the messaging server 50 may enable the communication of push notifications (communication 64A) to the IP networked device 30H.

As shown in FIG. 2A, the messaging server 50 may send a request to the IP networked device 30H that informs, directs, or requests the device 30H to communicate with the session processing system 20A via the $1^{st}$ communication protocol and $1^{st}$ channel (communication 64A). When the session processing system 20A does not have knowledge that the IP networked device 30H is capable of communicating via a $2^{nd}$ communication protocol and $2^{nd}$ channel (alternative contact available to communicate with device 30H (activity 94A)), the sessions processing system 20A may send a request to communicate with the device 30H via the $1^{st}$ communication protocol and $1^{st}$ channel (activity 102A and communication 68A of FIG. 2A). Such a communication may fail when the IP networked device 30H is not actively expecting or monitoring for messages via the $1^{st}$ communication protocol and $1^{st}$ channel (activity 82A of algorithm 80A of FIG. 4A). An IP networked device 30H may forward a requested or required response to the requesting session processing system 20A (activity 84A of FIG. 4A and communication 66A of FIG. 4A). The IP networked device 30H may send the response (communication 66A) via the $1^{st}$ communication protocol and $1^{st}$ channel or via the $2^{nd}$ communication protocol and $2^{nd}$ channel. In an embodiment, the IP networked device 30H may send the response (communication 66A) via the $1^{st}$ communication protocol and $1^{st}$ channel where the response may identify the IP networked device 30H and the associated User.

A session processing device 20A may wait a predetermined time interval (activity 104A of FIG. 3A) for the IP networked device 30H to send an expected response (activity 98A). If the IP networked device 30H does not response within the predetermined time interval (times out), then the session processing system 20A may not enable a first device to communicate with the IP networked device 30H. Otherwise, when the session processing system 20A receives the expected response (activity 98A) within the predetermined time interval (activity 104A), the session processing system 20A may enable communication between a device and the IP networked device 30H (activity 102A and communication 68A). The communication 68A may be via the $1^{st}$ communication protocol and the $1^{st}$ communication channel.

In an embodiment, the $1^{st}$ protocol(s) may be a SIP protocol and the channel(s) maybe related SIP channel(s). It is noted that $1^{st}$ protocol may include multiple protocols and the first channel may include several channel(s) in an embodiment. In such an embodiment, a session processing device 20A-20D may enable communication with an IP networked device 30H via a SIP protocol(s) and related SIP channel(s). An architecture 10A-10C may employ various sessions processing systems 20B-20D as part of the SIP channel(s) as a function of the IP networked device's location in an architecture (10A-C and FIGS. 1A-1C). In an embodiment, the $2^{nd}$ protocol(s) may include push notification protocol(s) and the $2^{nd}$ channel(s) maybe include related push notification channel(s). In such an embodiment, a session processing device 20A-20D may send push notification messages to an IP networked device 30H via a push notification protocol and related push notification channels that may include the messaging server 50.

FIG. 2B is a diagram of communication 60B between an IP networked device 30H, a SIP RT media session processing system 20A, and a push notification messaging server 50 in a distributed communication architecture 10A-10C according to various embodiments. FIG. 3B is a flow diagram illustrating several methods for a SIP RT media session processing system according to various embodiments. FIG. 4B is a flow diagram illustrating several methods for an IP networked device supporting SIP protocol communications and push notification communications according to various embodiments. As shown in FIG. 2B and FIG. 3B, when a SIP event or session is created or received for the IP networked device (activity 92B of algorithm 90B of FIG. 3B) and the IP networked device is determined or known to be able to or can receive push notifications (activity 94B—push notifications available), the session processing system 20A may send a push notification message via a push channel (by directing or requesting the messaging server 50 to contact the IP device 30H in an embodiment) to re-register with the session processing system 20A via SIP protocols (activity 96B and communications 62B and 64B of FIG. 2B).

As shown in FIG. 4B, an IP networked device 30H including support, application(s), or interface 38H to communicate on a SIP channel via SIP protocol, may register with a session processing system 20A at the start of the related application or interface (activity 81B of algorithm 80B of FIG. 4B). In an embodiment, the IP networked device 30H may provide normal SIP (IP addresses in an embodiment) contacts and push notification contacts or information when available for the device 30H in a registration message. Via normal SIP protocols, an IP networked device 30H may be required to periodically re-register with a session processing system 20A of a SIP architecture 10A-10C. As noted, such periodic re-registrations may waste limited resources including the IP networked device's 30H energy storage and bandwidth in the architecture 10A-10C. In an embodiment, the IP networked device 30H may only re-register with a session processing system 20A when it receives a push notification from the system 20A to re-register (activities 82B and 83B and communication 66B). The session processing system 20A may only request or require an IP networked device to re-register when a session involving the IP networked device 30H is created or received.

Similar to algorithm 90A of FIG. 3A, a session processing device 20A may wait a predetermined time interval (time out) for the IP networked device 30H to respond (re-register) (activities 98B and 104B) and send an invite (signal—(communication 68B)) to the IP networked device 30H once a valid re-register response is received via SIP protocols and related SIP channel(s) (activity 102B). When push notification is not available for the IP networked device (activity 94B), the session processing device 20A may still send an invite (signal) to the IP networked device 30H (communication 68B). The IP networked device 30H may wait for the invite signal (activity 86B—communication 68B) for a predetermined time interval (time out) (activity 84B) and wait for a new push notification when the time interval expires (times out). Once the invite signal is received from the session processing system 20A, the IP networked device 30H may send an appropriate SIP protocol response to the invite including an ACK (acknowledgment) message (activity 88B and communication 72B) to agree to participate in a SIP event including a RT media event or session. Then the architecture 10A-10C via the session processing systems 20A-20D may enable RT media communications between the IP networked device 30H (communication 74B) and another IP networked device 30A-30I of the architecture 10A-10C.

FIG. 5A illustrates a block diagram of a device 230 that may be employed at least in part in a session processing system 20A-D and messaging servers 50 in various embodiments. The device 230 may include a central processing unit (CPU) 232, a random access memory (RAM) 234, a read only memory (ROM) 237, a local wireless/GPS modem/transceiver 244, a display 247, a camera 257, a speaker 245, a rechargeable electrical storage element 256, and an antenna 246. The CPU 232 may include a sessions module 254. The RAM 234 may include a queue or table 248 where the queue 248 may be used to store session events, notifications, objects, and maps. The RAM 234 may also include program data, algorithm, and session data and session instructions (applications (APP) 237A). The rechargeable electrical storage element may be a battery or capacitor in an embodiment.

The modem/transceiver 244 or CPU 232 may couple, in a well-known manner, the device 230 in architecture 10A-C to enable communication with session devices 30A-I, session processing system 20A-D, or messaging server 50. The modem/transceiver 244 may also be able to receive global positioning signals (GPS) and the CPU 232 may be able to convert the GPS signals to location data that may be stored in the RAM 234. The ROM 237 may store program instructions to be executed by the CPU 232 or sessions module 254.

FIG. 5B illustrates a block diagram of a device 260 that may be employed at least in part in a IP networked device 30A-I in various embodiments. The device 260 may include a central processing unit (CPU) 262, a random access memory (RAM) 264, a read only memory (ROM) 266, a display 268, a user input device 272, a transceiver application specific integrated circuit (ASIC) 274, a microphone 288, a speaker 282, storage 276, electrical energy storage unit 286, and an antenna 284. The CPU 262 may include a session module 292. The RAM 264 may include a queue 278 where the queue 278 may store session/notification data.

The ROM 266 is coupled to the CPU 262 and may store the program instructions to be executed by the CPU 262 and session module 292. The ROM 266 may include applications and instructions for the session module 292. The RAM 264 may be coupled to the CPU 262 and may store temporary program data, overhead information, and the queue 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear multimedia content.

The microphone 288 and speaker 282 may be incorporated into the device 260. The microphone 288 and speaker 282 may also be separated from the device 260. Received data may be transmitted to the CPU 262 via a serial bus 275 where the data may include messages, digital media content, or session information. The transceiver ASIC 274 may include an instruction set necessary to communicate in architectures 10A-C. The ASIC 274 may be coupled to the antenna 284 to communicate session events and content. When a message is received by the transceiver ASIC 274, its corresponding data may be transferred to the CPU 262 via the serial bus 275. The data can include wireless protocol, overhead information, session data, and content to be processed by the device 260 in accordance with the methods described herein.

The rechargeable electrical storage element 286 may be a battery or capacitor in an embodiment. The storage 276 may be any digital storage medium and may be coupled to the CPU 262 and may store temporary program data, overhead information, session events, and content. Any of the components previously described can be implemented in a number of ways, including embodiments in software. Thus, the devices 230, 260 elements including the RAM 234, ROM 237, CPU 232, modem/transceiver 244, storage 276, CPU 262, RAM 264, ROM 266, and transceiver ASIC 274, may all be characterized as "modules" herein.

The modules may include hardware circuitry, single or multi-processor circuits, memory circuits, software program modules and objects, firmware, and combinations thereof, as desired by the architect of the architecture 10A-C and as appropriate for particular implementations of various embodiments. Devices 30A-I and systems 20A-D and 50 may communicate in architecture 10A-C using one or more known digital communication formats including a cellular protocol such as code division multiple access (CDMA), time division multiple access (TDMA), Global System for Mobile Communications (GSM), cellular digital packet data (CDPD), Worldwide Interoperability for Microwave Access (WiMAX), satellite format (COMSAT) format, and local protocol such as wireless local area network (commonly called "WiFi"), Near Field Communication (NFC), radio frequency identifier (RFID), ZigBee (IEEE 802.15 standard) (and Bluetooth.

As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz. Non-EDR (extended data rate) Bluetooth protocols may employ a Gaussian frequency-shift keying (GFSK) modulation. EDR Bluetooth may employ a differential quadrature phase-shift keying (DQPSK) modulation.

The WiFi protocol may conform to an Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, Devices 30A-I and systems 20A-D and 50 may communicate in architecture 10A-C via a WiFi protocol.

The cellular formats CDMA, TDMA, GSM, CDPD, and WiMax are well known to one skilled in the art. It is noted that the WiMax protocol may be used for local communication between the one or more Devices 30A-I and systems 20A-D and 50 in architecture 10A-C. The WiMax protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards. The ZigBee protocol may conform to the IEEE 802.15 network and two or more wireless power converters 30G may form a mesh network.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment.

What is claimed is:

1. A method for a real-time media session processing system in a communication architecture, the communication architecture including a messaging server and an Internet Protocol (IP) device, the method including:
    upon receiving a request to conduct a real-time media event with the IP device via a first communication protocol, sending a request to the messaging server via a second communication protocol to send a message to the IP device via the second communication protocol, requesting the IP device to communicate with the session processing system; and
    upon receiving a response from the IP device via the first communication protocol, sending a message to the IP device via the first communication protocol to participate in a real-time media event.

2. The method for a real-time media session processing system in a communication architecture of claim 1, wherein the first communication protocol employs Session Initiation Protocol (SIP).

3. The method for a real-time media session processing system in a communication architecture of claim 1, wherein the second communication protocol employs push notification protocols.

4. The method for a real-time media session processing system in a communication architecture of claim 1, wherein the method includes upon receiving a response from the IP device via the first communication protocol within a predetermined time interval, sending a message to the IP device via the first communication protocol to participate in a real-time media event.

5. The method for a real-time media session processing system in a communication architecture of claim 1, wherein the method includes upon receiving a request to conduct a real-time media event with the IP device via a first communication protocol determining whether the IP device can receive messages via a second communication protocol and then sending a request to the messaging server via the second communication protocol to send a message to the IP device via the second communication protocol requesting the IP device to communicate with the session processing system when the IP device can receive messages via the second communication protocol.

6. The method for a real-time media session processing system in a communication architecture of claim 5, wherein the method includes sending a message to the IP device via the first communication protocol to participate in a real-time media event when the IP device cannot receive messages via the second communication protocol.

7. The method for a real-time media session processing system in a communication architecture of claim 1, wherein the method includes upon receiving a request to conduct a real-time media event with the IP device via a first communication protocol determining whether the IP device can receive messages via a second communication protocol and then sending a message to the IP device via the first communication protocol to participate in a real-time media event when the IP device cannot receive messages via the second communication protocol.

8. A method for a real-time media session processing system in a communication architecture, the communication architecture including a messaging server and a plurality of Internet Protocol (IP) devices, the method including:
    upon receiving a request to conduct a real-time media event from a first IP device with a second IP device of the plurality of IP devices via a first communication protocol, sending a request to the messaging server via a second communication protocol to send a message to the second IP device via the second communication protocol requesting the second IP device to communicate with the session processing system; and
    upon receiving a response from the second IP device via the first communication protocol, sending a message to the second IP device via the first communication protocol to participate in a real-time media event with the first IP device.

9. The method for a real-time media session processing system in a communication architecture of claim 8, wherein the first communication protocol employs Session Initiation Protocol (SIP).

10. The method for a real-time media session processing system in a communication architecture of claim 8, wherein the second communication protocol employs push notification protocols.

11. The method for a real-time media session processing system in a communication architecture of claim 8, wherein the method includes upon receiving a response from the second IP device via the first communication protocol with a predetermined time interval, sending a message to the second IP device via the first communication protocol to participate in a real-time media event with the first IP device.

12. The method for a real-time media session processing system in a communication architecture of claim 8, wherein the method includes upon receiving a request to conduct a real-time media event from a first IP device with a second IP device of the plurality of IP devices determining whether the second IP device can receive messages via a second communication protocol and then sending a request to the messaging server via the second communication protocol to send a message to the second IP device via the second communication protocol requesting the second IP device to communicate with the session processing system when the second IP device can receive messages via the second communication protocol.

13. The method for a real-time media session processing system in a communication architecture of claim 12, wherein the method includes sending a message to the second IP device via the first communication protocol to participate in a real-time media event with the first IP device when the second IP device cannot receive messages via the second communication protocol.

14. The method for a real-time media session processing system in a communication architecture of claim 8, wherein the method includes upon receiving a request to conduct a real-time media event from a first IP device with a second IP device of the plurality of IP devices via a first communication protocol determining whether the second IP device can receive messages via a second communication protocol and then sending a message to the second IP device via the first communication protocol to participate in a real-time media event with the first IP device when the second IP device cannot receive messages via the second communication protocol.

15. A method for an Internet Protocol (IP) based communication User apparatus in a communication architecture, the communication architecture including a messaging server and a real-time media session processing system, the method including:
upon receiving a message requesting the IP based communication User apparatus to communicate with the session processing system from a messaging server via a second communication protocol, sending a message to the session processing system via a first communication protocol; and
upon receiving a message from the session processing system via the first communication protocol to participate in a real-time media event after receiving a message requesting the IP based communication User apparatus to communicate with the session processing system from a messaging server via the second communication protocol, sending a response to the session processing system via the first communication protocol agreeing to participate in a real-time media event.

16. The method for an IP based communication User apparatus in a communication architecture of claim 15, wherein the first communication protocol employs Session Initiation Protocol (SIP).

17. The method for an IP based communication User apparatus in a communication architecture of claim 16, wherein the second communication protocol employs push notification protocols.

18. The method for an IP based communication User apparatus in a communication architecture of claim 17, wherein the method includes sending a registration message to the session processing system via the first communication protocol, the registration message including an indication that the IP based communication User apparatus is capable of communicating via the second communication protocol.

19. The method for an IP based communication User apparatus in a communication architecture of claim 16, wherein the method includes sending a registration message to the session processing system via the first communication protocol, the registration message including an indication that the IP based communication User apparatus is capable of communicating via the second communication protocol.

20. The method for an IP based communication User apparatus in a communication architecture of claim 15, wherein the method includes upon receiving a message requesting the IP based communication User apparatus to communicate with the session processing system from a messaging server via the second communication protocol, sending a message to the session processing system via the first communication protocol within a predetermined time interval.

* * * * *